United States Patent [19]

Geer

[11] Patent Number: 4,702,758

[45] Date of Patent: Oct. 27, 1987

[54] TURBINE COOLING WAXY OIL

[75] Inventor: Julia S. Geer, Bellaire, Tex.

[73] Assignee: Shell Western E&P Inc., Houston, Tex.

[21] Appl. No.: 868,920

[22] Filed: May 29, 1986

[51] Int. Cl.⁴ ............................................. B01D 9/04
[52] U.S. Cl. ........................................ 62/532; 62/48;
62/88; 137/13; 166/370; 208/37; 208/370
[58] Field of Search ...................... 62/48, 532, 123, 86,
62/87, 88; 166/370; 208/37, 370; 137/13

[56] References Cited

U.S. PATENT DOCUMENTS

| Re. 25,759 | 4/1965 | Walker et al. | 55/174 |
| Re. 30,281 | 5/1980 | Tackett et al. | 208/37 |
| 2,303,823 | 12/1942 | Coberly | 208/37 |
| 2,352,883 | 7/1944 | Bolley | 62/532 |
| 3,027,319 | 3/1962 | Meyer et al. | 208/370 |
| 3,350,296 | 10/1967 | Torobin | 208/37 |
| 3,429,800 | 2/1969 | Sparks | 62/544 |
| 3,454,464 | 7/1969 | Tuggle et al. | 208/370 |
| 3,773,650 | 11/1973 | Hislop et al. | 208/37 |
| 3,846,279 | 11/1974 | Merrill, Jr. | 137/13 |
| 3,910,299 | 10/1975 | Tackett et al. | 208/37 |
| 3,963,795 | 6/1976 | Wood et al. | 62/532 |
| 4,013,544 | 3/1977 | Merrill, Jr. | 208/37 |
| 4,050,742 | 9/1977 | Hughes et al. | 137/13 |
| 4,141,924 | 2/1979 | Sun | 62/532 |

FOREIGN PATENT DOCUMENTS 768655 2/1957 United Kingdom .
768654 2/1957 United Kingdom .

Primary Examiner—Ronald C. Capossela

[57] ABSTRACT

A stream of gas and waxy oil is cooled by an expansion turbine to form a wax/oil slurry, and the slurry is pipeline transported without wax deposition in the pipeline and/or to prevent melting of permafrost along the pipeline right of way.

25 Claims, 2 Drawing Figures

TURBINE COOLING WAXY OIL

BACKGROUND OF THE INVENTION

The transportation of oils with high cloud points by pipelining can result in the deposition of wax at the pipewall if the oil properties are such that wax precipitates out of solution with the oil at temperatures above the surroundings of the pipeline. In this type of situation, wax will deposit at the pipewall where the oil cools to below its cloud point. One method for prevention of wax deposits in this manner is to pre-cool the oil to, at, or below the coldest wall temperature prior to the oil entering the pipeline. The wax is left in the oil stream. The wax then flows in the pipeline as a slurry with the oil. Thus, as the system is designed, the oil, wax, and pipeline are at essentially the same temperature, the wax will not deposit on the pipe wall. In addition to preventing wax deposits, another benefit of operating a "cold" pipeline, particularly in severely cold environments, is the protection of the frozen soil or permafrost from thawing by a heated, possibly insulated, pipeline. The problem of thaw subsidence due to melting the permafrost is eliminated by operating a pipeline at the same temperature as the frozen soil. The usual method for precooling of wax deposition is then transferred to the heat exchangers or chillers rather than the pipeline.

U.S. Pat. No. 3,454,464 discloses the choke cooling of a petroleum stream in a production well to restrict paraffin deposition. The following U.S. Pats. Nos. are relevant to the present invention: 3,027,319; 2,303,823; Re. 30,281; Re. 25,759. Also of relevance are British Pats. Nos. 768,655 and 768,654.

Commonly assigned application Ser. No. 868,919, filed May 29, 1986 is relevant to the present invention.

SUMMARY OF THE INVENTION

Figure 1:
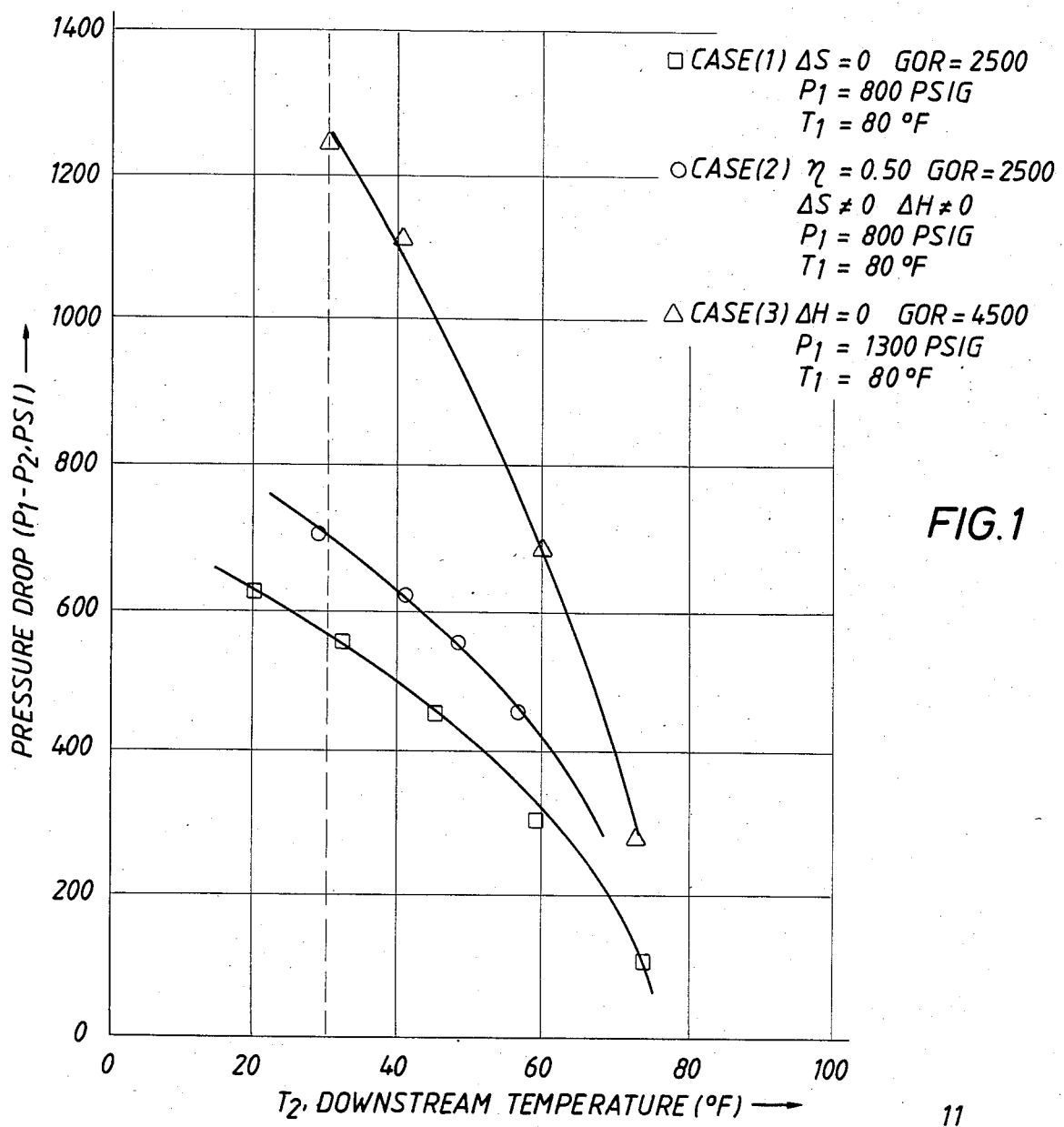
FIG. 1 is a comparison of isentropic, turbine and isenthalpic methods for cooling oil and gas.

The present invention pertains to a process for pipelining a waxy oil to essentially eliminate deposition of wax on the pipeline wall. This is accomplished by effecting a sudden pressure drop of the oil to chill the oil, thereby forming a slurry of wax particles and oil. In a preferred embodiment the pressure on an oil and gas stream is suddenly dropped by passing the mixture of oil and gas through an expansion turbine to chill the mixture and form a slurry of wax particles and oil and finally, the slurry is transported through a pipeline.

Other purposes, advantages and features of the invention will be apparent to one skilled in the art upon review of the following.

DESCRIPTION OF PREFERRED EMBODIMENTS

The present invention pertains to the transmission of petroleum oils through pipes or other conduits, and more particularly to the transmission of petroleum oils containing waxes. "Crude" or "crude oil" as used herein denotes petroleum oil as produced from the ground or any fluid derived from such oil. "Wax" as used herein denotes any substance, for example paraffin or the like, which starts to crystalize or solidify at a critical temperature, hereinafter called the "cloud point" or "crystalization point". Many petroleum oils contain paraffins, asphaltenes and the like, which have a relatively low temperature of crystalization or cloud point. When a petroleum oil containing wax is passed through a pipe or conduit the inner wall of which is at a temperature below the cloud point of the wax, the wax tends to deposit on such walls in sufficient amounts to materially reduce the free area inside the conduit through which the oil must pass, thus retarding the flow of the oil. Accordingly, a primary purpose of the present invention is to prevent such deposition from petroleum oils which have a considerable wax content. Waxy crudes have been observed in the 0° to 140° F. range. Cloud points outside of this range are possible. The cloud point of any such oil can be readily determined by one skilled in the art by cooling a film of oil and watching for wax crystals with a microscope or centrifuging a cooling oil and noting the temperature at which wax crystals are thrown out of the oil or by noting the temperature at which wax begins to deposit as a surface exposed to the oil is cooled.

The present invention provides a novel method for cooling oil quickly to below its cloud point without any wax deposition. Other creative methods for cooling oil to below its cloud point include employing an isenthalpic or choking process (covered in the aforementioned commonly assigned application). However, there are also advantages to cooling the oil with a process which approaches constant entropy as opposed to an isenthalpic process. An isentropic process will achieve the necessary cooling at a lower pressure drop and presumably lower gas/oil ratio than an isenthalpic process. Further, utilizing an expansion turbine with the isentropic expansion of a fluid will result in the production of work. This shaft work can be converted to power, such as the generation of electricity. If the turbine operates reversibly as well as adiabatically, i.e., isentropically, then the energy equation becomes:

$$W_s = -(\Delta H)_s \tag{1}$$

The work given by the above equation is the maximum shaft work that can be produced by adiabatic expansion of a fluid from a given initial state to a given final pressure. Actual machines produce an amount of work equal to 75% or 80% of this. Thus, an expansion efficiency is defined as:

$$\eta = \frac{W_s(\text{actual})}{W_s(\text{isentropic})} = \frac{\Delta H}{(\Delta H)_s}$$

where $\Delta H$ is the actual enthalpy change of the fluid passing through the turbine. FIG. 1 depicts a comparison of the three cases mentioned above; (1) the limiting case of reversible or isentropic flow, (2) case one with a "worst case" expansion turbine efficiency of 0.50, and (3) an isenthalpic process. All cases were calculated with a natural gas and oil mixture and an upstream temperature of 80° F. Cases one and two used a gas/oil ratio of 2500 and an upstream pressure of 800 psig while case three required a higher gas/oil ratio of 4500 and higher upstream pressure of 1300 psig. It can be seen that to be able to cool to the same downstream temperature, case two (with the expansion efficiency included) requires a higher pressure drop than the isentropic case, however, case two requires much less pressure drop than the isenthalpic case.

Figure 2:
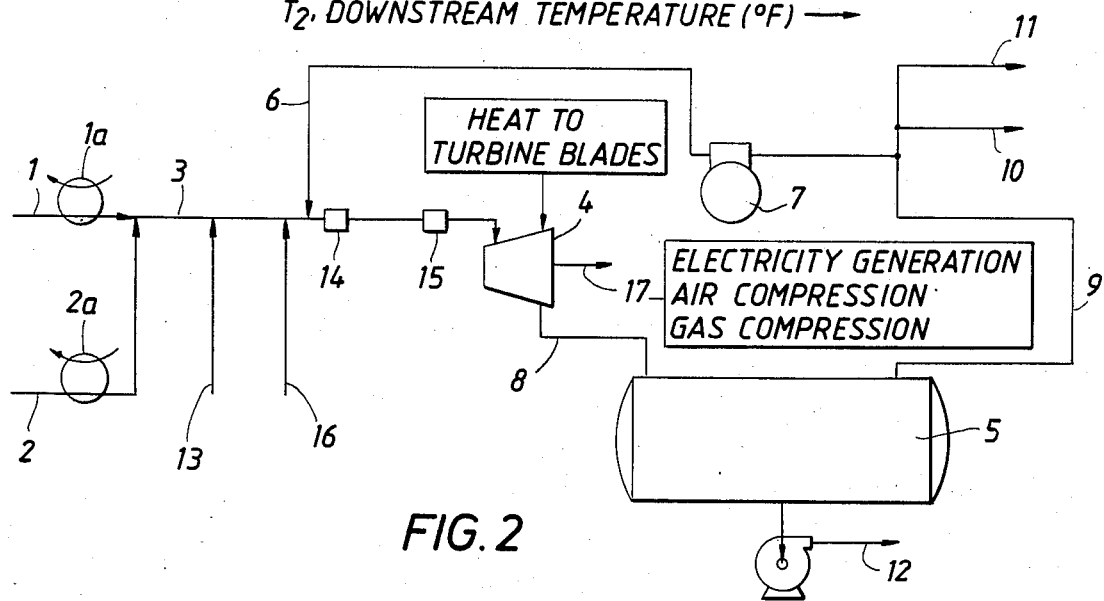
FIG. 2 is a schematic view of the invention.

FIG. 2 illustrates application of the technique of this invention. An oil stream 1, and a gas stream 2, represent the components of the full wellhead stream. They may be separated ahead of this process for measurement, dehydration, cooling, or other reasons. If necessary, the wellhead stream, whether separted or not, is cooled in a cooler (1a and 2a) by conventional means such as a heat exchanger, to a temperature preferably slightly above the cloud point of the oil. Thus, stream 3 represents the full wellhead stream less any water removed and at a temperature preferably slightly above the oil cloud point. If necessary, stream 13 containing methanol or the like, may be used to dehydrate stream 3. This two-phase stream of gas and oil is then expanded through an expansion turbine 4 to achieve the necessary cooling. The turbine is utilized to convert energy from the fluid stream 3 into mechanical work 17; which, for example, can be used for conversion to power, air compression and gas compression. The turbine can be used as an integral part of the control strategy. The turbine can control the temperature in separator 5 and provide back pressure on the upstream facilities. By way of example, for the case of Seal Island crude and a certain gas composition, with a cloud point of 70° F., at a gas/oil ratio (GOR) of 2500, and upstream conditions of 80° F. and 800 psig, the oil and gas would cool to approximately 30° F. at a downstream pressure of 100 psig and a turbine efficiency of 0.50. The above mentioned Seal Island example is only illustrative. For a specific design, a process optimization will be required. Variables to be considered include: (1) desired temperature drop, (2) composition of the oil and gas (3) GOR through the turbine, (4) pressure drop across the turbine, (5) separator pressure, (6) amount of light ends left in the crude, (7) compressor horsepower, (8) pump horsepower, and (9) cost of energy.

If stream 3 does not have a sufficient gas/oil ratio, some gas may be recycled via line 6 and gas compressor 7 to be combined with the stream 3. Stream 8 is passed to separator 5. Gaseous stream 9 may be utilized for fuel 10, recycled via line 6, reinjected via line 11, or flared or sold. Oil stream 12 containing wax formed in the turbine is pumped into a pipeline for further transportation.

The concept of the present invention is not limited to severely cold areas such as the Arctic. For example, cooling to approximately 65° F. will eliminate wax deposition of Gulf of Mexico crudes and cooling to approximately 40° F. will do the same for pipelines in Michigan. In general terms, the range of potential crude oils covered includes all crude oils with cloud points above the minimum wall temperature and pour points not more than 5° to 10° F. above minimum wall temperature.

The use of the turbine for precooling the crude oil eliminates wax deposition in the cooling process. Wax deposits on the wall of a heat exchanger, pipeline, etc., only if the oil is cooled below its cloud point at the wall. If the oil is cooled in the bulk stream, the wax precipitates out of the oil and remains in the oil stream. It does not stick to the wall unless it precipitates at the wall. Turbine cooling provides a sudden chilling of the oil stream. The wax precipitates out of the oil in very small particles and is carried in the oil stream as a slurry. From a viscosity point of view, larger crystals are preferred and additives such as pour point depressants may be added via line 16 to modify the wax crystal.

In a preferred embodiment a static mixer 14 is installed immediately upstream of the turbine to provide good mixture of oil and gas. This mixing, along with turbulent flow from a high flow rate, for example 25 feet per second, upstream of the turbine, provides a uniform dispersion, small oil drop size and thereby stable turbine performance.

Separator 5 is designed to handle a wide variety of wax/oil slurries. Various options include a cone bottom tank, tank stirrers, external circulation pumps and oil jets (not shown). The separator may also include provisions such as swirl tubes (not shown) and demisters (not shown) to separate the oil droplets from the gas. To avoid the problem of gas bubbles being entrapped in or attached to the wax particles causing them to tend to float on the oil, a distributed discharge header (not shown) at the gas/oil interface may be used with an external degassing boot (not shown). All facilities downstream of the turbine that are exposed to atmospheric temperature are preferably insulted to prevent the wall temperture from dropping below the oil temperature. Facilities upstream of the turbine are also preferably insulated where the wall temperature can drop to the cloud point of the oil. The use of insulation minimizes wax deposition on the walls of the facility.

A thermal break 15 is preferably included between the choke and the upstream piping, for example, an insulating gasket between the turbine and the upstream piping. This break and the high velocity in the static mixer above, minimize cooling of the upstream piping and eliminate most wax deposition in the upstream piping.

The water content of the oil and gas is critical in a cooling process. If the temperature downstream of the turbine is above 32° F., hydrate formation is controlled by dehydration of the oil and gas upstream of the turbine and/or injection of a dehydration agent such as methanol or other hydrate inhibitor and/or antifreeze via line 13. If the temperature downstream of the turbine is 32° F. or below, ice formation also occurs. As with the wax, water freezes going through the turbine and very small particles of ice will be slurried with the crude oil. Ice formation may be controlled by injection of an antifreeze via line 13.

The crude oil taken out of the separator may not meet pipeline vapor pressure specifications. Accordingly, options include stripping the crude with an inert gas, stabilizing the crude at the end of the cold pipeline and using a stabilizer overhead for fuel, and pipelining both gas and oil to the end of the cold line, and separating and stabilizing the crude.

The foregoing description of the invention is merely intended to be explanatory thereof. Various changes in the details of the described apparatus may be made within the scope of the appended claims without departing from the spirit of the invention.

What is claimed is:

1. A process for pipelining a waxy oil to essentially eliminate deposition of wax on the pipeline wall, comprising:
   providing a pressurized mixture of said waxy oil and a gas;
   effecting a sudden pressure drop of said mixture of the oil and the gas through an expansion turbine, thereby expanding the gas and quickly cooling the oil to below its cloud point in the substantial absence of wax deposition and forming a slurry of wax particles and oil; and
   pipelining the slurry.

2. The process of claim 1 including mixing the oil with the gas.

3. The process of claim 1 wherein the turbine is utilized to convert energy from the fluid stream into mechanical work.

4. The process of claim 1 wherein the work is utilized for on-site electricity generation.

5. The process of claim 1 wherein the work is utilized for air compression.

6. The process of claim 1 wherein the work is utilized for gas compression.

7. The process of claim 1 wherein at least part of the gas is removed after forming the slurry.

8. The process of claim 7 wherein at least part of the removed gas is reinjected into a formation from which the oil is produced.

9. The process of claim 7 wherein at least part of the removed gas is used as fuel at the site of the slurry-forming operation.

10. The process of claim 1 wherein at least part of the removed gas is recycled to be mixed with the oil.

11. The process of claim 1 wherein the oil and/or gas are at least partially dehydrated prior to mixing.

12. The process of claim 1 wherein methanol is added to the oil/gas mixture prior to effecting the sudden pressure drop.

13. The process of claim 1 wherein hydrate inhibitor is added to the oil/gas mixture prior to effecting the sudden pressure drop.

14. The process of claim 1 wherein antifreeze is added to the oil/gas mixture prior to effecting the sudden pressure drop.

15. The process of claim 1 wherein a static mixer and high velocity in the piping upstream of the pressure drop location are included.

16. The process of claim 1 wherein a thermal break is installed between the pressure drop location and upstream piping to prevent heat transfer between the pressure drop location and the upstream piping.

17. The process of claim 1 wherein some light ends remain in the oil after cooling and are transported with the oil to a pipeline destination and used as fuel for stabilizing the oil.

18. The process of claim 1 wherein after chilling and prior to entering the pipeline, the oil is stripped with an inert gas to remove light ends.

19. The process of claim 1 wherein after chilling, the oil and some of the gas are transported as a two-phase fluid to a pipeline destination.

20. The process of claim 1 wherein after chilling, the oil, wax and some of the gas are transported as a three-phase fluid to a pipeline destination.

21. The process of claim 1 wherein upstream of the pressure drop location, the oil and gas are cooled by conventional means to a temperature above the cloud point of the oil.

22. The process of claim 1 wherein ice particles formed in the chilling step are slurried with the oil.

23. The process of claim 1 wherein the pressure drop step is used for process control.

24. The process of claim 1 wherein addition of pour point depressant is used for modifying wax crystal size.

25. The process of claim 1 wherein turbine blades are heated to prevent wax deposits on the blades.

* * * * *